United States Patent [19]

Beaupre

[11] Patent Number: 5,016,387
[45] Date of Patent: May 21, 1991

[54] FISHING LURE HAVING A SPINNABLE BUOYANT BODY EQUIPPED WITH REFLECTIVE SURFACED FINS

[76] Inventor: Paul A. Beaupre, 1802 37th Way SE., Auburn, Wash. 98002

[21] Appl. No.: 404,648

[22] Filed: Sep. 8, 1989

[51] Int. Cl.$^5$ ............................................. A01K 85/00
[52] U.S. Cl. .................... 43/42.33; 43/42.21; 43/42.47
[58] Field of Search ................. 43/42.21, 42.2, 42.19, 43/42.32, 42.33, 42.34, 42.36, 42.46, 42.47

[56] References Cited

U.S. PATENT DOCUMENTS

| | | | |
|---|---|---|---|
| 341,954 | 5/1886 | Skinner | 43/42.34 |
| 2,175,635 | 10/1939 | Mertens | 43/42.36 |
| 2,938,293 | 5/1960 | Richardson | 43/42.32 |

FOREIGN PATENT DOCUMENTS

| | | | |
|---|---|---|---|
| 0159993 | 6/1953 | Australia | 43/42.21 |
| 1379882 | 1/1975 | United Kingdom | 43/42.34 |

Primary Examiner—Richard K. Seidel
Assistant Examiner—James Minen
Attorney, Agent, or Firm—Roy E. Mattern, Jr.

[57] ABSTRACT

A fishing lure has a tear shaped buoyant body to which reflective surfaced fins are secured. The fins are made of a material having a memory to always return to their original shape and contour. The fins may be composed of a clear material with a Mylar laminate. The fins are secured in positions to cause the spinning of the buoyant body when the body is pulled through the water. The finned lure creates flashes via the reflective surfaces when pulled. The fishing lure is threaded along the leader using a central longitudinal hole thereof.

7 Claims, 2 Drawing Sheets

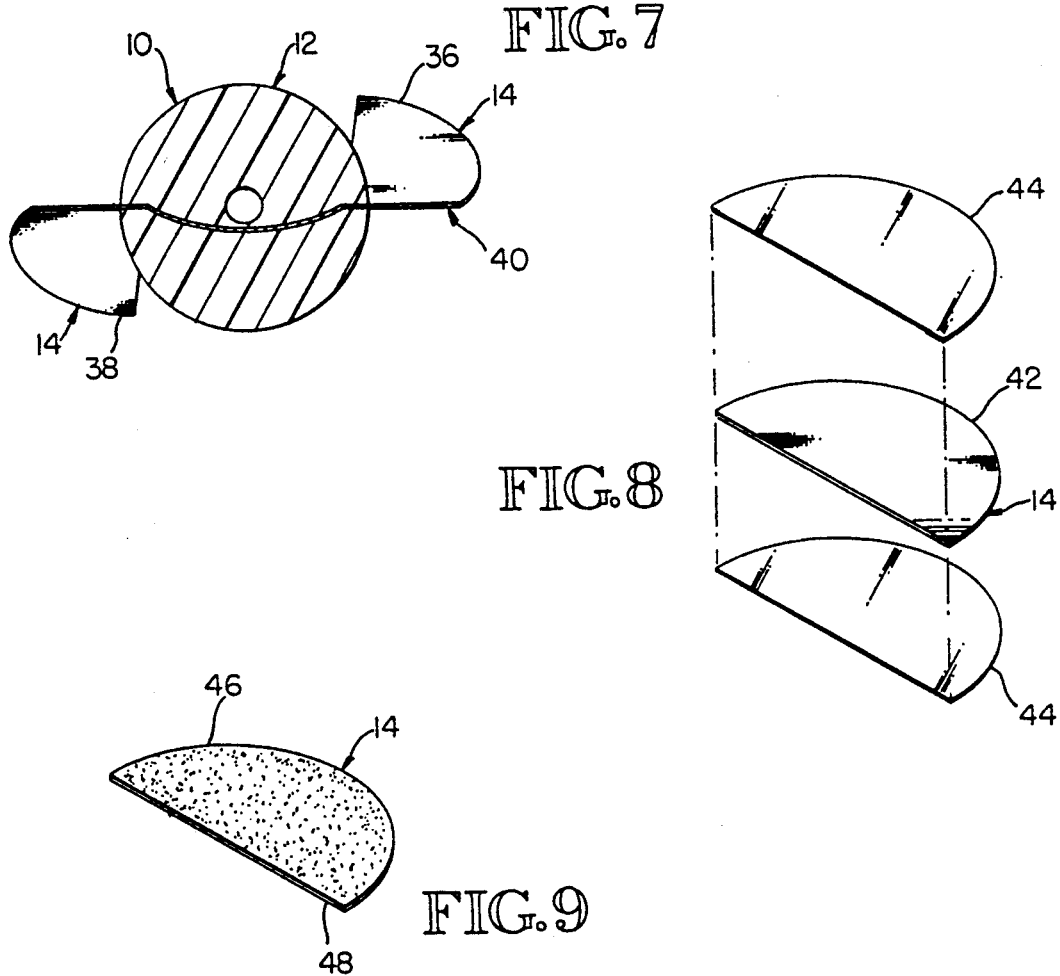

FISHING LURE HAVING A SPINNABLE BUOYANT BODY EQUIPPED WITH REFLECTIVE SURFACED FINS

BACKGROUND

A fishing lure having a tear shaped buoyant body with a central hole to receive a leader, and having non reflective surfaced fins made of a material not having a memory to always return to the original shape and contour of the fins, which are positioned to cause spinning of the lure, has been and is available in the marketplace.

SUMMARY

A fishing lure is arranged for sliding along a leader of an overall fishing outfit of pole, reel, line, sinker, leader, and lure, and for freely rotating about the leader. The body of the lure is buoyant and hydrodynamically shaped, preferably like a tear drop, being blunt and curved at the bow, having the largest cross section forward of the half length thereof, and then tapered to a pointed stern. This body is caused to spin, when pulled through the water, by the diagonal placement of port and starboard fins, which are also referred to as being wings, on the opposite sides of the lure body. They are either separate fins, each in part embedded into the lure body, or they are integrally formed as a unit and in part embedded into and across the lure body.

The lure body is preferably colored using multiple colors. The fins have a resilient base material, which, after any reasonable deflection returns to an initial contour. If this resilient base material is not reflective, or not reflective enough, then a film of reflective material is adhered to the resilient base material, creating the reflective surfaced fins or wings which create flashes, when this fishing lure is being pulled through the water.

DRAWINGS

This fishing lure, threadable on a leader and spinnable about the leader, having a buoyant tear shaped body equipped with reflective surfaced fins, having a memory to always return to their original shape and contour, is illustrated in the drawings, wherein:

FIG. 7 is a sectional view thereof, showing the partial interfitting of the integral fins;

FIG. 8 is an exploded partial perspective view illustrating the pre-positioning of a reflective surface material adjacent to a resilient base material, which has a memory to always return to the original shape and contour of the fins; and FIG. 9 is a perspective view indicating the painting on of a coating of paint which contains metallic glitter particles.

DESCRIPTION OF PREFERRED EMBODIMENTS OF THE INVENTION

Figure 1:
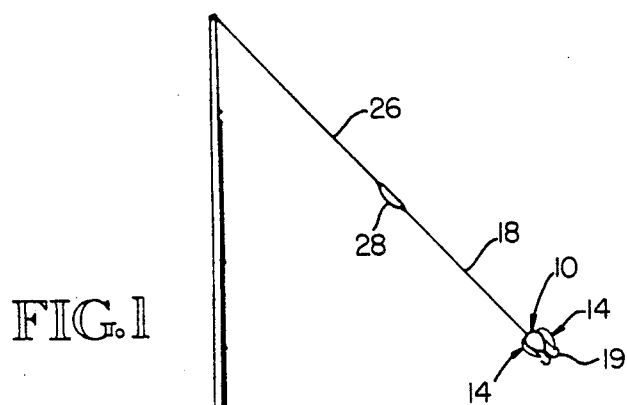
FIG. 1 is a perspective view of a fishing outfit of a pole, reel, line, sinker, leader, and this fishing lure.

In the drawings, in FIGS. 1 through 6, a preferred embodiment of this fishing lure 10 having a spinnable buoyant body 12, equipped with reflective surfaced fins 14, is illustrated. As shown in FIG. 1, the buoyant body 12 has a longitudinal center hole 16 to slidably receive a leader 18, of an overall fishing outfit 20 of a pole 22, reel 24, line 26, sinker 28, and leader 18, and hook 19.

Figure 2:
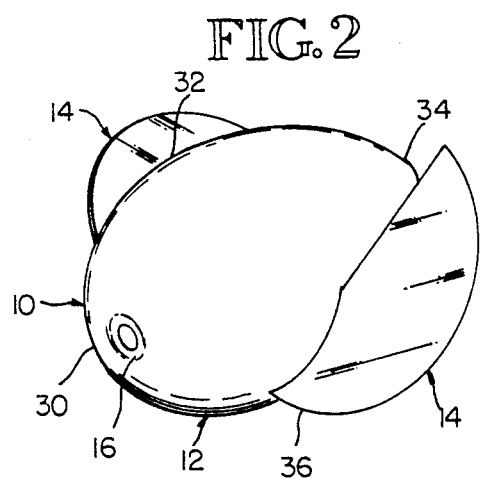
FIG. 2 is an enlarged perspective view of the fishing lure.
Figure 3:
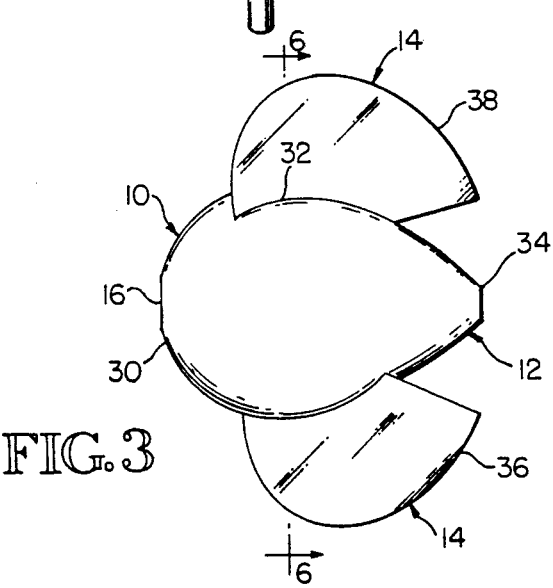
FIG. 3 is a top view thereof.
Figure 5:
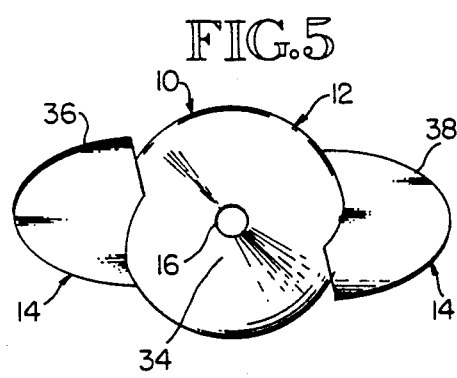
FIG. 5 is a stern view thereof.
Figure 4:
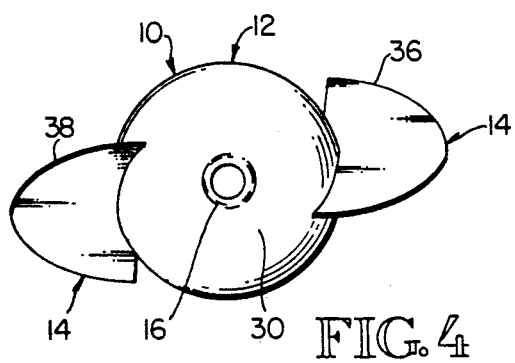
FIG. 4 is a bow view thereof.

As illustrated in FIG. 2, the body 12 is buoyant and hydrodynamically shaped, preferably like a tear drop, being blunt and curved at the bow 30. The body 12 has its largest cross section 32 located forward of the half length thereof. Thereafter, the body 12 is tapered to a pointed stern 34.

Figure 6:
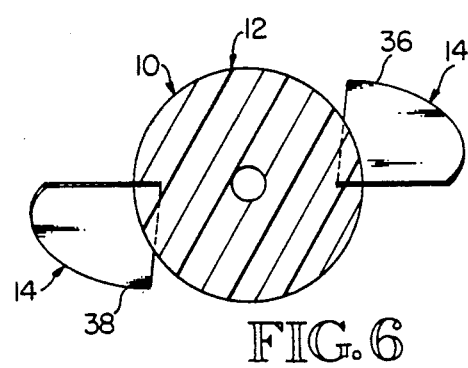
FIG. 6 is a sectional view thereof, showing the partial interfitting of two separate fins.

This tear drop shaped body 12, when pulled through the water, is caused to spin by the diagonal placement of port and starboard fins 36, 38. These fins 36, 38 are also referred to as wings. They are either separate fins 36, 38, each in part embedded and secured into the lure body 12, or they are integrally formed as a unit 40, and in part embedded and secured into the lure body 12. The separate fins 36, 38 are shown in FIG. 6, and the integral unit 40 of fins 36, 38 is shown in FIG. 7.

The port and starboard fins 36, 38 are made of a resilient base material 42, having a memory to always return to the original shape and contour of the fins, which itself may have a reflective surface or reflective surfaces. If, however, the selected resilient base material 42 is not reflective or not reflective enough, then a film of reflective material 44 is adhered to the port and starboard fins 36, 38. Or instead of a film of material 44, metallic glitter particles 46 in a plastic or latex painting medium 48 is spread over the surface of the resilient base material 42 to create the reflective surfaces thereof.

The reflective material 44 may be a Mylar material. Mylar tapes are available in the following groups of clear and colored: crushed pearl, pearl, solid, glitter, motion, scale, fishscale, mini-fish, squiggle, rainbow, and laser. The resilient base material may be a portion of either plastic sheeting, latex, or metal. Preferably, the resilient base material is a clear cellulose acetate about eight mils thick, and the Mylar tape is selected from the fishscale group. The materials used for the buoyant body are cork, an expanded polystyrene material, or an injected plastic material formed as a hollow body 12.

I claim:

1. A fishing lure having a spinnable buoyant body equipped with reflective surfaced fins to create flashes, when the fishing lure is pulled through the water, comprising:

(a) a buoyant plastic body having a longitudinal center hole adapted to slidably receive a leader portion of an overall fishing line, and a hydrodynamically shaped tear drop exterior;

(b) port and starboard fins made of a clear cellulose acetate, having a memory to always return to the original shape and contour of the fins, are diagonally secured to the buoyant plastic body, to cause this body to spin about the leader, when this fishing lure is being pulled through the water, said port and starboard fins having upper and lower surfaces, said upper surfaces being visible from corresponding lower surfaces; and (c) Mylar materials having reflective surfaces which are laminated onto the port and starboard fins, whereby upon the spinning of this fishing lure flashes are created.

2. A fishing lure, as claimed in claim 1, wherein the clear cellulose acetate fins are eight mils thick.

3. A fishing lure, as claimed in claim 2, wherein the Mylar material is the fish scale design mylar material.

4. A fishing lure as claimed in claim 3, wherein the plastic body is made of expanded polystyrene material.

5. A fishing lure, as claimed in claim 4, wherein the buoyant body is blunt and curved at the bow thereof, has the largest cross section thereof located forward of the half length thereof, and has a tapered pointed stern thereof.

6. A fishing lure, as claimed in claim 4 wherein the port and starboard fins are partially embedded and secured to the buoyant body.

7. A fishing lure, as claimed in claim 4 wherein the port and starboard fins are integrally formed and partially embedded and secured to the buoyant body.

* * * * *